US008098692B2

(12) United States Patent
Albu et al.

(10) Patent No.: US 8,098,692 B2
(45) Date of Patent: Jan. 17, 2012

(54) METHOD AND APPARATUS FOR HIGH SPEED LVDS COMMUNICATION

(75) Inventors: Remus Albu, Forest Hills, NY (US); Peter J. M. Janssen, Hopewell Junction, NY (US); John Dean, Stornville, NY (US); Gene Turkenich, Hillsdale, NJ (US); Alok Govil, White Plains, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 510 days.

(21) Appl. No.: 12/438,564

(22) PCT Filed: Aug. 28, 2007

(86) PCT No.: PCT/IB2007/053457
§ 371 (c)(1),
(2), (4) Date: Feb. 24, 2009

(87) PCT Pub. No.: WO2008/026164
PCT Pub. Date: Mar. 6, 2008

(65) Prior Publication Data
US 2010/0014620 A1    Jan. 21, 2010

Related U.S. Application Data

(60) Provisional application No. 60/823,779, filed on Aug. 29, 2006.

(51) Int. Cl.
*H04J 3/06* (2006.01)
*H04L 7/027* (2006.01)

(52) U.S. Cl. ......... 370/503; 370/518; 375/355; 375/343

(58) Field of Classification Search .................. 370/350, 370/503, 507–510, 518; 375/354, 343, 355–356, 375/358, 330
See application file for complete search history.

(56) References Cited

U.S. PATENT DOCUMENTS

| 5,699,389 | A | 12/1997 | Beladi et al. | |
|---|---|---|---|---|
| 5,995,571 | A * | 11/1999 | Inuzuka | 375/367 |
| 6,292,116 | B1 | 9/2001 | Wang et al. | |
| 6,304,619 | B1 * | 10/2001 | Citta et al. | 375/343 |
| 6,374,361 | B1 | 4/2002 | Lee et al. | |
| 7,218,670 | B1 * | 5/2007 | Lesea et al. | 375/226 |
| 7,295,601 | B1 | 11/2007 | Sinha et al. | |
| 7,613,263 | B2 * | 11/2009 | Allen | 375/355 |
| 7,953,162 | B2 * | 5/2011 | Shetty | 375/257 |
| 7,995,693 | B2 * | 8/2011 | Lee | 375/359 |
| 2002/0018444 | A1 | 2/2002 | Cremin et al. | |
| 2002/0114416 | A1 | 8/2002 | Enam et al. | |
| 2003/0026295 | A1 * | 2/2003 | Baum et al. | 370/503 |
| 2004/0184564 | A1 * | 9/2004 | Chen et al. | 375/330 |
| 2007/0116065 | A1 * | 5/2007 | Kawasaki | 370/516 |
| 2007/0248201 | A1 * | 10/2007 | Ker et al. | 375/355 |

* cited by examiner

*Primary Examiner* — Kwang B Yao
*Assistant Examiner* — Candal Elpenord

(57) ABSTRACT

A method and system communicates payload data over a plurality of low voltage differential signaling (LVDS) channels (50). First device (100) transmits the payload data and synchronization information to the second device (150) over N LVDS channels (50), along with a word clock synchronized to the payload data. The second device generates M LVDS receive clocks from the word clock, each having a same frequency that is P times a frequency of the word clock, and each having a different phase. Each of N LVDS receivers (160) of the second device (150): correlates the synchronization data with a reference word using each of the M LVDS receive clocks to produce a correlation value for each of the M LVDS receive clocks; selects a selected LVDS receive clock producing a greatest correlation value; and receives the payload data for the corresponding LVDS channel (50) using the selected LVDS receive clock.

20 Claims, 4 Drawing Sheets

METHOD AND APPARATUS FOR HIGH SPEED LVDS COMMUNICATION

This invention pertains to high speed data communications, particularly to a method and apparatus for high speed, low voltage differential signaling (LVDS) communication, more particularly to such a method for communicating video data to a display device.

Low voltage differential signaling (LVDS) channels are widely used for high bandwidth data communication with low electromagnetic interference (EMI). The LVDS standard requires the receiver to recover the transmit clock and multiply its frequency with the "serialization factor." On chip noise, jitter, and inherent delays restrict the physical length of the recovered clock distribution network, therefore limiting the number of LVDS receivers that can be driven by the same clock.

A large variety of "clock recovery" and "clock skew control" approaches are used for high bandwidth/high clock rate data streaming. Examples include local phase locked loop (PLL), delay locked loop (DLL) with programmable feedback, clock recovery from data stream (e.g., Manchester decoding), and tunable delay lines.

However, for some applications, these clock recovery solutions are impractical.

For example, consider the case of communicating video data to a high resolution UXGA-W-a liquid crystal on silicon (LCOS) device with programmable color depth, programmable number of primaries, and low power requirements. Assuming that an LVDS channel can operate at 1.0 Gbps, for high data rates (25 Gbps data input, for 12 bits per color, 5 primary colors and 180 Hz frame rate) a total of 25 LVDS data inputs is required. Including a PLL/DLL for each LVDS receiver would draw a tremendous amount of power. Meanwhile, in such a case the clock frequency may be in excess of 500 MHz (2 ns period). Data set-up and hold times need to be controlled within very tight margins. Therefore, a static LVDS clock line distribution would not be sufficient because the clock skew due to propagation delay along the clock distribution line to the LVDS receivers would lead to incorrect data registering. Therefore, in such an application, a fixed LVDS clock recovery technique is not a suitable solution.

Furthermore, in some applications the total data rate to be communicated may be highly variable. More specifically, under some conditions a full complement of LVDS data receivers may be necessary to support the total data rate requirement, while under other conditions, the total data rate may be reduced such that it can be supported by fewer than the full complement of LVDS data receivers. In that case, under lower data rate conditions, more LVDS data receivers are being employed than are necessary. This in turn results in a greater power consumption than is necessary.

Additionally, from time to time it can be expected that perhaps one or more LVDS receivers may become inoperative or defective. In that case, the entire payload data cannot be delivered successfully, even though there may exist sufficient data capacity on the remaining LVDS channels to communicate all of the payload data.

Accordingly, it would be desirable to provide a system and method for communicating data over a plurality of LVDS channels which employs improved clock recovery and slew control techniques. It would further be desirable to provide a device with a plurality of LVDS receivers which reduce or eliminate power waste when the total data rate is reduced to a level that does not require the employment of all available LVDS receivers. It would still further be desirable to provide a device with a plurality of LVDS receivers which can continue to receive payload data successfully under certain conditions even when one or more LVDS receivers become inoperative or defective.

In one aspect of the invention, a method of communicating payload data from a first device to a second device over a plurality of low voltage differential signaling (LVDS) channels, comprises: transmitting payload data and synchronization information from the first device to the second device over N LVDS channels; transmitting a word clock from the first device to the second device, where the word clock is synchronized to the payload data; receiving the payload data and synchronization information of each of the N LVDS channels at a corresponding one of N LVDS receivers of the second device; receiving the word clock at the second device; generating M LVDS receive clocks from the word clock, each of the M LVDS receive clocks having a same frequency that is P times a frequency of the word clock, and each of the M LVDS receive clocks having a different phase with respect to each other; and at each of the N LVDS receivers: correlating the synchronization data with a reference word using each of the M LVDS receive clocks to produce a correlation value for each of the M LVDS receive clocks, selecting a selected LVDS receive clock producing a greatest correlation value, and receiving the payload data for the corresponding LVDS channel using the selected LVDS receive clock.

In another aspect of the invention, a device for receiving payload data from over a plurality of low voltage differential signaling (LVDS) channels comprises: a word clock receiver adapted to receive a word clock and to generate therefrom M LVDS receive clocks from the word clock, each of the M LVDS receive clocks having a same frequency that is P times a frequency of the word clock, and each of the M LVDS receive clocks having a different phase with respect to each other; and N LVDS receivers each adapted to receive data and synchronization information from a corresponding one of N LVDS channels. Each of the N LVDS receivers includes a differential line receiver adapted to receive the data and synchronization information; M sample shift registers each adapted to receive a corresponding one of the M LVDS receive clocks and in synchronization thereto, to store therein the synchronization information from the differential line receiver; M correlators each adapted to correlate a reference word with the synchronization information stored in a corresponding one of the M sample shift registers to produce a correlation value for each of the M LVDS receive clocks; a clock selector adapted to receive the correlation values from each of the M correlators and to select a one of the M LVDS receive clocks producing a greatest correlation value; and a data register adapted to receive the selected LVDS receive clock and in synchronization thereto, to store therein the payload data from the differential line receiver.

In yet another aspect of the invention, a system for communicating payload data over a plurality of low voltage differential signaling (LVDS) channels comprises: a data transmitting device, including, N LVDS receivers adapted to transmit payload data and synchronization information over N LVDS channels; a word clock transmitter adapted to transmit a word clock, where the word clock is synchronized to the payload data; and a data receiving device connected to the data transmitting device by N LVDS channels, the data receiving device including, a word clock receiver adapted to receive the word clock and to generate therefrom M LVDS receive clocks from the word clock, each of the M LVDS receive clocks having a same frequency that is P times a frequency of the word clock, and each of the M LVDS receive clocks having a different phase with respect to each other; and N LVDS receivers each adapted to receive data and synchronization information from a corresponding one of the N LVDS channels. Each of the N LVDS receivers includes a differential line receiver adapted to receive the data and synchronization information; M sample shift registers each adapted to receive a corresponding one of the M LVDS receive clocks and in synchronization thereto, to store therein the synchronization information from the differential line receiver; M correlators each adapted to correlate a reference word with the synchronization information stored in a corresponding one of the M shift registers to produce a correlation value for each of the M LVDS receive clocks; a clock selector adapted to receive the correlation values from each of the M correlators and to select a one of the M LVDS receive clocks producing a greatest correlation value; and a data register adapted to receive the selected LVDS clock and in synchronization thereto, to store therein the payload data from the differential line receiver.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

As used herein, "payload data" is user data or application data to be communicated across one or more communication channels, and does not include separate control, signaling, formatting, or other broadly-defined "data" that is employed to configure, control, or properly operate the communication channels. For example, in the case where data is being communicated to a display device, payload data may be video data to be provided via the column lines to the pixels of the display device.

Figure 1:
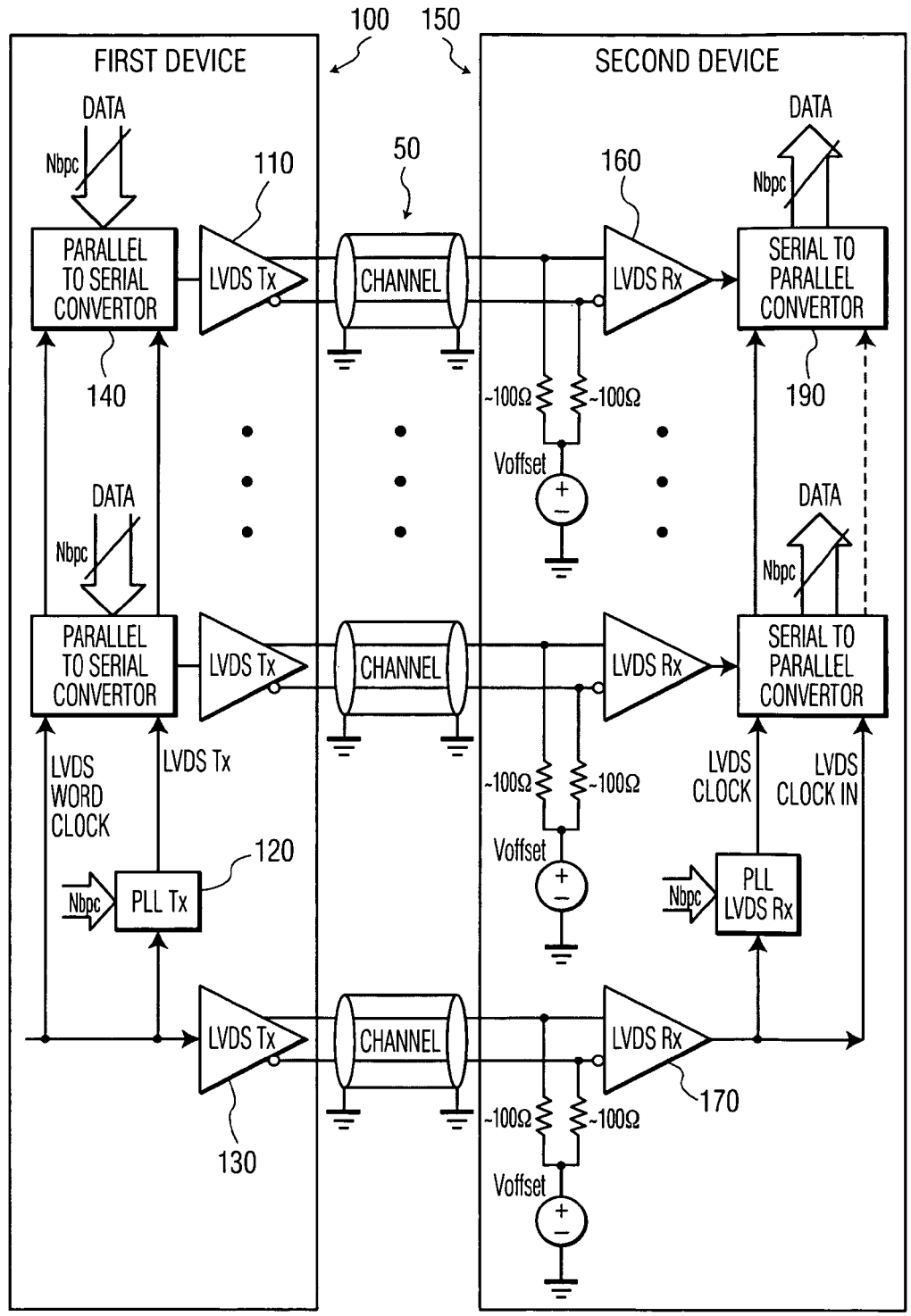
FIG. 1 is a simplified functional block diagram illustrating various components in one embodiment of a system employing a plurality of LVDS communication channels.

FIG. 1 is a functional block diagram illustrating various components in one embodiment of a system 10 employing a plurality of low voltage data signaling (LVDS) communication channels 50. As will be appreciated by those skilled in the art, one or more of the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined in any physical implementation.

System 10 includes a first device 100 and a second device 150. First device 100 is a data transmitting device, and second device 150 is a data receiving device. In one embodiment, first device 100 comprises a video data processing device, and second device 150 comprises a display device including a plurality of display pixels. In one embodiment, second device 150 may comprise a high resolution UXGA-W-a liquid crystal on silicon (LCOS) device, which may in turn have programmable color depth, a programmable number of primary colors, and therefore a data rate that may change in accordance with programmable operating parameters.

In turn, first device 100 includes a plurality of LVDS transmitters 110, a clock generation circuit 120, and a word clock transmitter 130. Beneficially, first device 100 also includes a plurality of parallel-to-serial converters 140, each associated with a corresponding one of the LVDS transmitters 110. Meanwhile, second device 150 includes a plurality of LVDS receivers 160, and a word clock receiver 170. Beneficially, second device 150 also includes a plurality of serial-to-parallel converters 190, each associated with a corresponding one of the LVDS receivers 160.

In the system 10, LVDS transmitters 110 communicate with LVDS receivers 160 across a plurality of LVDS channels 50. Each LVDS channel 50 may comprise a backplane transmission line, a coaxial connection, or other suitable physical layer interconnection media.

Operationally, parallel-to-serial converters 140 each receive P-bit wide parallel data and serialize the data for transmission. Meanwhile, clock generation circuit 130 receives a word clock having a frequency $F_{LVDS\_WORD}$ and generates an LVDS transmit clock having a frequency, $F_{LVDS\_TX}$ according to equation (1):

$$F_{LVDS\_TX}/F_{LVDS\_WORD}=P \quad (1)$$

The clocks $F_{LVDS\_TX}$ and $F_{LVDS\_WORD}$ are both provided to parallel-to-serial converters 140.

LVDS transmitters 110 each transmit a serial LVDS data stream including payload data over a corresponding LVDS channel 50 at the LVDS transmit clock frequency, $F_{LVDS\_TX}$. Thus, the LVDS serial data stream is synchronized to both the word clock and the LVDS transmit clock.

Also, word clock transmitter 130 transmits the word clock having the frequency $F_{LVDS\_WORD}$. Beneficially, word clock transmitter 130 transmits the word clock to second device 150 across a separate LVDS channel 50.

At second device 150, LVDS receivers 160 each receive a serial LVDS data stream including payload data over a corresponding LVDS channel 50 at an LVDS receive clock frequency, $F_{LVDS\_RX}$, according to equation (2):

$$F_{LVDS\_RX}/F_{LVDS\_WORD}=P \quad (2)$$

Also, word clock receiver 170 receives the word clock and generates therefrom a plurality (M) of LVDS receive clocks. Each of the M LVDS receive clocks has the same receive clock frequency, $F_{LVDS\_RX}$. The M LVDS receive clocks all have different phases with respect to each other. Advantageously, the phases of the M LVDS receive clocks are all equidistant from each other. In that case, for example, if M=8, then the LVDS receive clocks are separated from each other in phase by 360/8=45 degrees.

Each serial to parallel converter 190 receives serial data from a corresponding one of the LVDS receivers 160, together with the clocks $F_{LVDS\_RX}$ and $F_{LVDS\_WORD}$, and produces therefrom P-bit wide parallel data.

Beneficially, one or more LVDS transmitters 110 may be disabled at a particular time depending upon the payload data rate to be transmitted. For example, in one embodiment first device 100 may include L=24 LVDS transmitters 110. Now, consider a case where the current payload data bandwidth (rate) requirement is 13.9 Gbps, and where each LVDS channel 50 and associated LVDS receiver 160 can support a data rate of 900 Mbps. In that case, the number of active LVDS transmitters 110, N, can be found from equation (3):

$$N=\text{ceiling}(\text{Payload Data Rate/Maximum Channel Rate})$$

$$N=\text{ceiling}(13.9/0.9)=16 \quad (3)$$

So in this example, 16 LVDS transmitters 110 would be active, and another 10 LVDS transmitters 110 would be inactive and not transmitting any payload data. Advantageously, this can reduce the power consumption of first device 100.

Furthermore, assuming that second device 150 also has L=24 available LVDS receivers 160, then under this example only N=16 of these LVDS receivers 170 would be active, with 10 LVDS receivers 160 inactive, which also reduces power consumption in second device 150.

Beneficially, the number of active LVDS transmitters 110 in device 100 and the number of active LVDS receivers 160 in second device 150 are each programmable. In that case, first device 100 and second device 150 may each include a register storing a value, NLVDS, which identifies the number of currently active LVDS channels.

Figure 2:
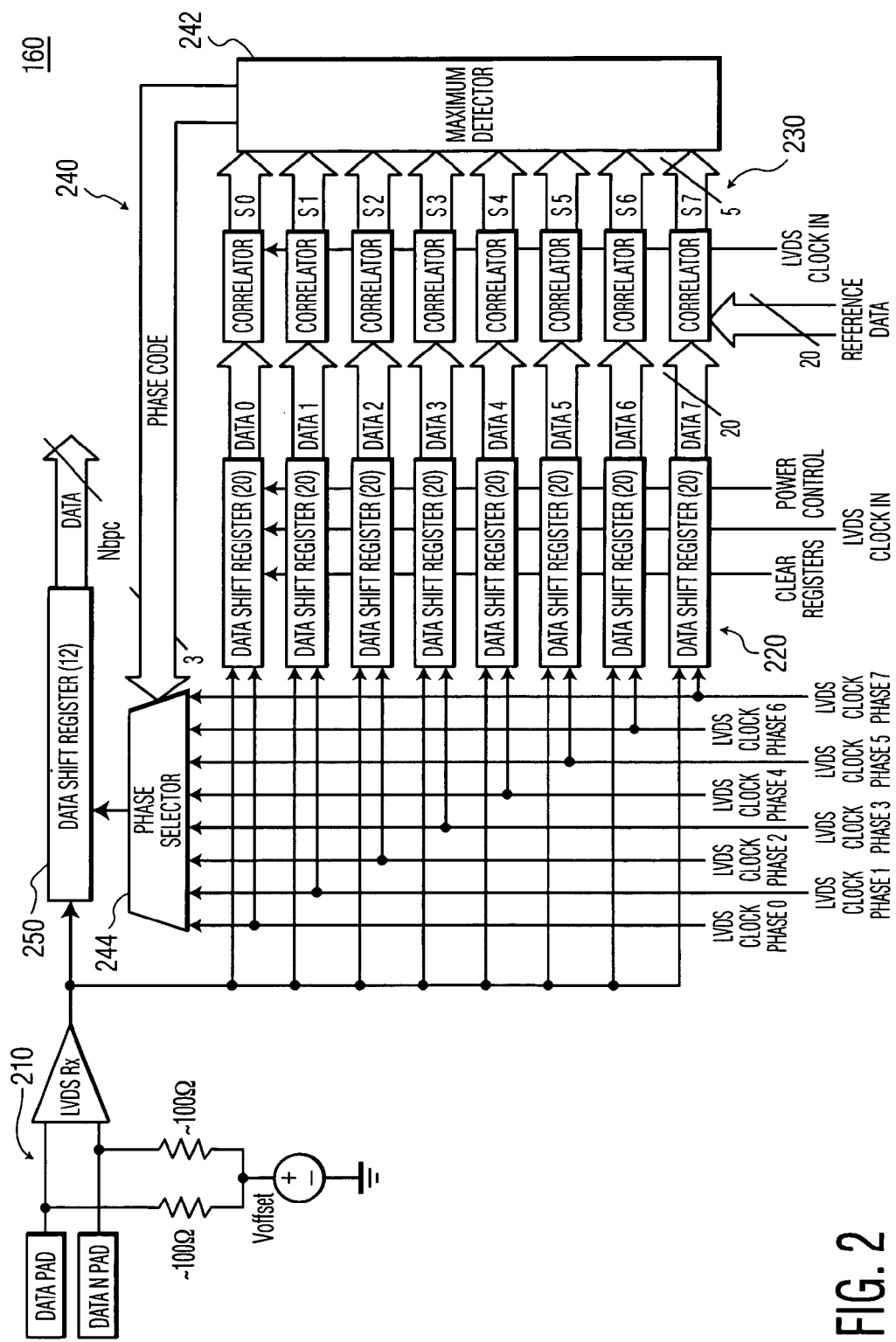
FIG. 2 is a simplified functional block diagram illustrating various components in one embodiment of an LVDS receiver.

FIG. 2 is a simplified functional block diagram illustrating various components in one embodiment of an LVDS receiver 160. LVDS receiver 160 includes a differential line receiver 210, M sample shift registers 220, M correlators 230, a clock selector 240, and a data register 250. In the embodiment of FIG. 2, clock selector 240 includes maximum detector 242 and phase selector 244.

which the sampled synchronization information produces the highest correlation with the known reference word.

In further detail, LVDS receiver 160 operates in pertinent part as follows. Differential line receiver 210 receives payload data and synchronization information over a corresponding LVDS channel 50, for example from an LVDS transmitter 110.

Table 1 shows one embodiment of an exemplary data structure that may be transmitted by an active LVDS transmitter 110 across a corresponding LVDS channel 50 to a corresponding active LVDS receiver 160. The data structure of Table 1 is only exemplary in nature, and in some embodiments and application one or more of the fields may be omitted, as appropriate. Table 1 may be employed where second device 150 is a display device including a plurality of display pixels, such as a high resolution UXGA-W-a liquid crystal on silicon (LCOS) device.

TABLE 1

| Synchronization word (12 bits) default 0xFFF | | | | | | | | | | | |
|---|---|---|---|---|---|---|---|---|---|---|---|
| sy0 | sy1 | sy2 | sy3 | | | | | | | | sy11 |
| Column Block number (5 bits), default 0x00 | | | | | Matching check | | | | | | |
| CB0 | CB1 | CB2 | CB3 | CB4 | 1 | 1 | 0 | 1 | 0 | 1 | 0 |
| Start Address, (9 bits), default 0x00 | | | | | | | | | Increment (3 bits), def. 1 | | |
| START 0 | START 1 | START 2 | START 3 | START 4 | START 5 | START 6 | START 7 | START 8 | I0 | I1 | I2 |
| Stop Address(9 bits), default 0x7F | | | | | | | | | | | |
| STOP 0 | STOP 1 | STOP 2 | STOP 3 | STOP 4 | STOP 5 | STOP 6 | STOP 7 | STOP 8 | 1 | 0 | 0 |
| Parity check | | | | | | | | | | | |
| P0 | P1 | P2 | P3 | P4 | P5 | P6 | P7 | P8 | P9 | P10 | P11 |
| Payload (Nbpc bits) | | | | | | | | | | | |
| Payload (Nbpc bits) | | | | | | | | | | | |
| Payload (Nbpc bits) | | | | | | | | | | | |
| Payload (Nbpc bits) | | | | | | | | | | | |
| Payload (Nbpc bits) | | | | | | | | | | | |
| Payload (Nbpc bits) | | | | | | | | | | | |
| Payload (Nbpc bits) | | | | | | | | | | | |

As discussed above, accurate clock recovery/distribution and clock skew compensation present significant challenges in prior art devices that include many LVDS receivers operating at high data rates. For example, the LVDS receive clock may reach frequencies in excess of 500 MHz (i.e., a 2ns cycle time). In that case, setup and hold time should be controlled within even tighter margins. Unfortunately, however, propagation delays for a clock signal distributed to a high number of LVDS receivers that are spaced apart from each other could easily reach 2ns, which would lead to incorrect data registering.

Beneficially, to address these challenges LVDS receiver 160 samples the input serial data signal with the M LVDS receive clocks having different phases with respect to each other to produce M sampled signals. Each sampled signal includes synchronization information that is known to LVDS receiver 160 a priori, such that LVDS receiver 160 can correlate every sampled signal with the expected synchronization information (e.g., a known reference word). Then, LVDS receiver 160 selects a one of the M LVDS receive clocks for The data structure of Table 1 includes a 12 bit synchronization word, a column block number, a matching check, a start address, an increment value, a stop address, a parity check word, and 7 words 12-bit words of payload data. When second device 150 is a display device including a plurality of display pixels, the column block number is used to identify a column block to which the payload data applies. The start, increment, and stop addresses apply to the addressed column block. The parity check value is used to determine whether a data structure is received correctly by LVDS receiver 160, and can therefore signal whether LVDS receiver 160 may be defective or inoperative, as will be discussed in greater detail below.

Turning again to FIG. 2, the M sample shift registers 220 each receives a corresponding one of the M LVDS receive clocks and in synchronization thereto, store therein the synchronization information received from differential line receiver 210. The M correlators 230 each correlate the synchronization information stored in a corresponding one of the M sample shift registers 220 with the known reference word to produce a correlation value for each of the M LVDS receive clocks. The reference word may be stored in a reference data register in a second device 150 including LVDS receiver 160.

Clock selector 240 receives the correlation values from each of the M correlators 230 and selects one of the M LVDS receive clocks that produced the greatest correlation value. More specifically, phase selector 244 receives all of the M LVDS receive clocks. Meanwhile, maximum detector 242 detects which one of the M correlators 230 outputs a maximum correlation value. In response thereto, maximum detector 242 outputs a command to phase selector 244 instructing phase selector 244 to select the one of the M LVDS receive clocks that produced the highest correlation value as a selected LVDS receive clock.

Finally, data register 250 receives the selected LVDS receive clock and in synchronization thereto, stores therein the payload data from differential line receiver 210.

Figure 3:
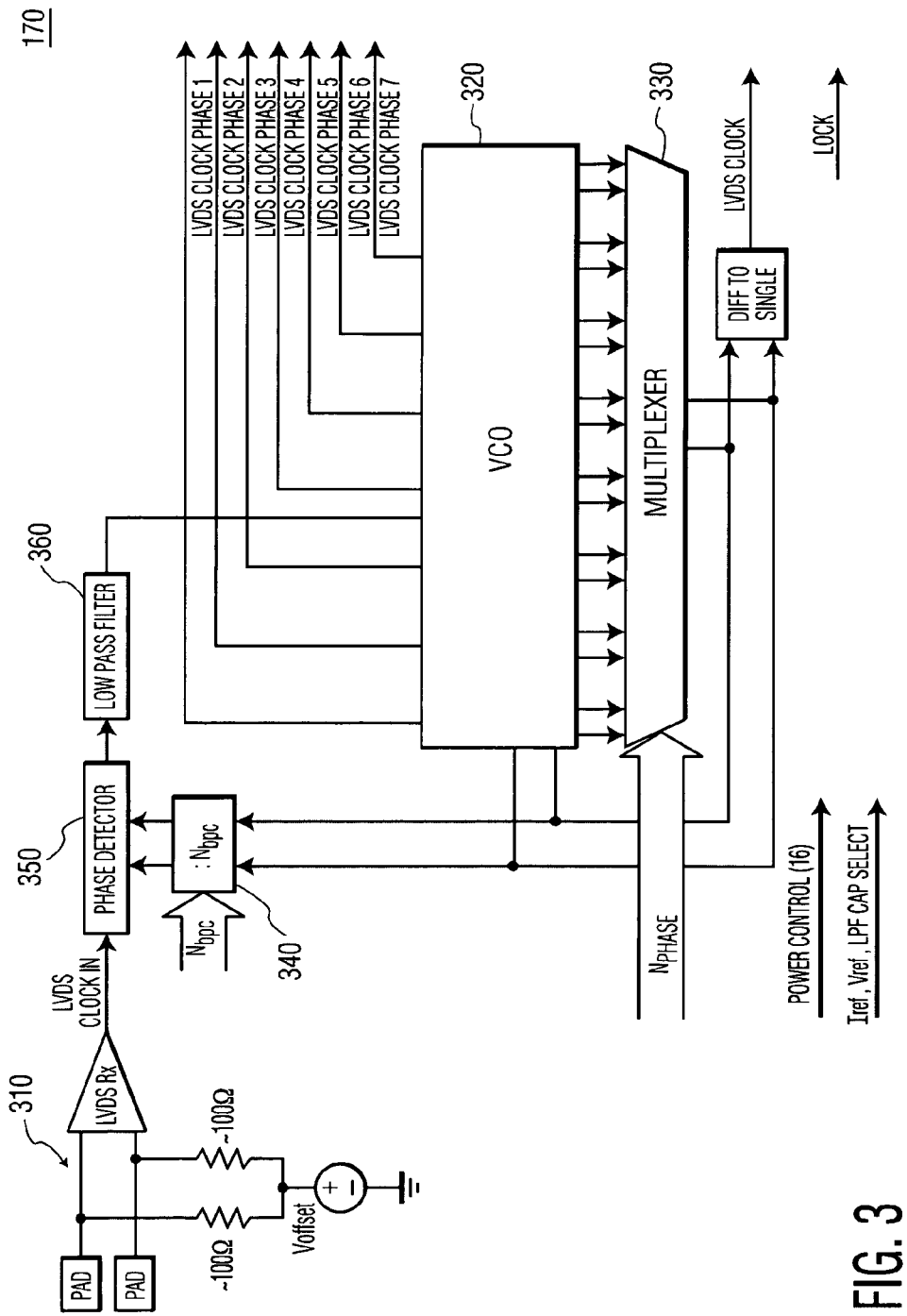
FIG. 3 is a simplified functional block diagram illustrating various components in one embodiment of a word clock receiver.

FIG. 3 is a simplified functional block diagram illustrating various components in one embodiment of a word clock receiver 170 for generating the M LVDS receive clocks.

Word clock receiver 170 includes a word clock differential line receiver 310, a multiple phase output voltage controlled oscillator 320, a multiplexer 330, a frequency divider 340, a phase detector 350, and a low pass filter 360.

Operationally, word clock differential line receiver 310 receives a differential word clock having the frequency $F_{LVDS\_WORD}$ and outputs the word clock to phase detector 350. Meanwhile, voltage controlled oscillator (VCO) 320 generates the M LVDS receive clocks and provides the M LVDS receive clocks to multiplexer 330. Multiplexer 330 selects and outputs one of the M LVDS receive clocks as a feedback clock. In one embodiment, multiplexer receives a phase number signal, Nphase, selects a one of the M LVDS receive clocks corresponding to the value of Nphase, and outputs the selected LVDS receive clock as a feedback clock. In that case, Nphase may be stored in a phase-lock loop (PLL) LVDS Receiver Phase Number Register in second device 150. Frequency divider 340 receives the feedback clock from multiplexer 330, divides the frequency of the feedback clock by P, and outputs a divided-down feedback clock to phase detector 350. Beneficially, frequency divider 340 is a programmable frequency divider. In that case, the frequency division ratio, P, may be supplied to the phase detector 350 from a PLL LVDS Receiver Divider Ratio Register in second device 150. Phase detector 350 receives the word clock from word clock differential line receiver 310, the divided-down feedback clock from frequency divider 340, compares the word clock to the divided-down feedback clock, and outputs a control voltage that varies in accordance with a frequency difference between the word clock and the divided-down feedback clock. The control voltage is filtered by low pass filter 360 to provide a feedback signal that will produce a stable control loop. The low pass filtered control voltage is in turn supplied to VCO 320 to adjust the output frequency thereof, i.e., the frequency $F_{LVDS\_RX}$ of the M LVDS receive clocks, to make it exactly P times the frequency $F_{LVDS\_WORD}$ of the word clock.

Thus, word clock receiver 170 generates M LVDS receive clocks all having a same frequency that is P times a frequency of the word clock, and each of the M LVDS receive clocks having a different phase with respect to each other. These M LVDS receive clocks are provided to each of the LVDS receivers 160, as explained above with respect to FIG. 2.

Figure 4:
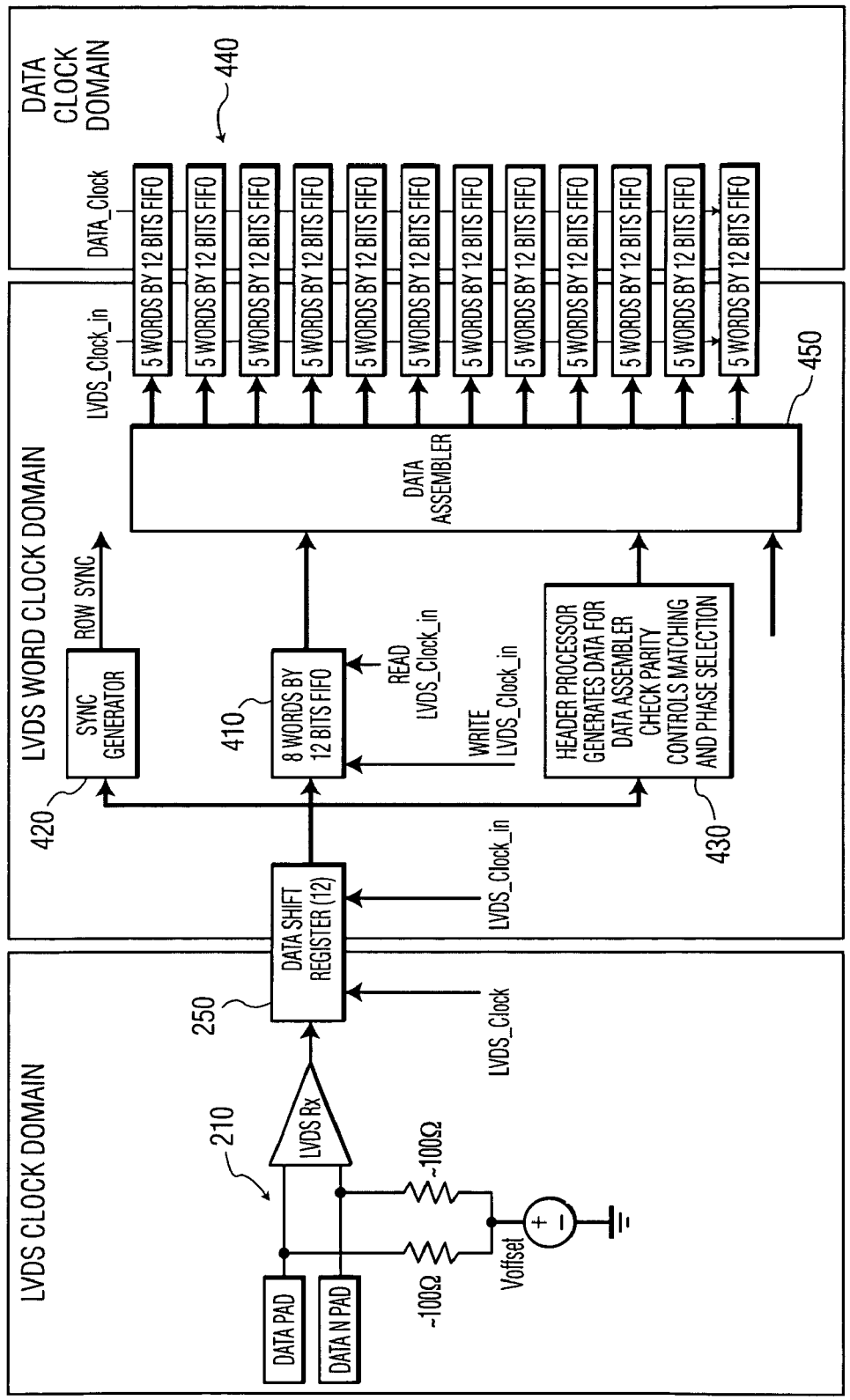
FIG. 4 illustrates a data processing structure in a device employing a plurality of LVDS receivers.

FIG. 4 illustrates a data processing structure in a second (receiving) device 150 employing a plurality of LVDS receivers. As illustrated in FIG. 4, a differential line receiver 210 of each LVDS receiver 160 receives a serial data stream comprising payload data and header data at an LVDS receive frequency $F_{LVDS\_RX}$. The serial data stream is input to data register 250 in accordance with the selected LVDS receive clock, as explained above.

Data is output from data register 250 in P-bit words in response to the word clock. In the example of FIG. 4, P=12. Data from each LVDS receiver 160 is shifted in P-bit words into a corresponding FIFO register 410 using the word clock. In turn, data from the FIFO registers 440 for all of the LVDS receivers 160 is provided to a data assembler 450. Data assembler output payload data in groups of S (e.g., S=5) words, each P (e.g., P=12) bits wide for further processing.

Also, in the example where second device 150 is a display device and the payload data is video data for columns of the pixels of the display device, synchronization information is transmitted to a sync generator 420.

Meanwhile, data is also supplied from data register 250 to a header processor 430 corresponding to the LVDS receiver 160 (e.g., one header processor for each LVDS receiver 160). Header processor 430 includes a parity checker. Parity checker checks the parity value of a received data packet for the corresponding LVDS receiver 160 against the parity value received from the first device 100 (e.g., see Table 1 above) to determine if the data has been received correctly, or with errors. If the parity values do not match, the corresponding LVDS receiver 160 may be determined to be defective.

Beneficially, second device 150 includes an LVDS Receiver Status Register that includes one or more status bits for each LVDS receiver 160 indicating whether the corresponding LVDS receiver 160 is operational or defective. In that case, when a parity check fails, the status bit(s) for the corresponding LVDS receiver 160i are changed in the LVDS Receiver Status Register to indicate that the corresponding LVDS receiver 160i is defective. At this time, second device 150 may disable the corresponding LVDS receiver 160i and notify first device 110 of this fact (e.g., via a separate $I^2C$ or microprocessor bus, etc.).

In that case, second device 110 may activate a replacement (N+1)th LVDS receiver 160j that is not currently being used to carry data among the total of L LVDS receivers 160 in second device 110, and may likewise again communicate this information to first device 110. In that event, the payload data that was being carried an LVDS channel 50i to defective LVDS receiver 160i is instead routed by first device 100 through a replacement LVDS transmitter 110j across LVDS channel 50j to replacement LVDS receiver 160j.

Alternatively, if there are no unused LVDS receivers or channels, then the LVDS transmit and LVDS receive data rates and the frequencies $F_{LVDS\_TX}$ and $F_{LVDS\_RX}$ of the LVDS transmit and receive clocks may be increased such that the data that was being received by LVDS channel corresponding to the defective LVDS receiver is now divided among the remaining LVDS channels to keep the payload data rate intact. In that case, the frequency of the word clock may also be increased in second device 150.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. A method of communicating payload data from a first device to a second device over a plurality of low voltage differential signaling (LVDS) channels, the method comprising: transmitting payload data and synchronization information from the first device to the second device over N LVDS channels; wherein N is an integer, transmitting a word clock from the first device to the second device, where the word clock is synchronized to the payload data; receiving the payload data and synchronization information of each of the N LVDS channels at a corresponding one of N LVDS receivers of the second device; receiving the word clock at the second device; generating M LVDS receive clocks from the word clock, each of the M LVDS receive clocks having a same frequency that is P times a frequency of the word clock, wherein P an integer, and each of the M LVDS receive clocks having a different phase with respect to each other; wherein M is an integer, and at each of the N LVDS receivers: correlating the synchronization information with a reference word using each of the M LVDS receive clocks to produce a correlation value for each of the M LVDS receive clocks, selecting a selected LVDS receive clock producing a greatest correlation value, and receiving the payload data for the corresponding LVDS channel (160) using the selected LVDS receive clock.

2. The method of claim 1, wherein the phases of the M LVDS receive clocks are equidistant from each other.

3. The method of claim 1, wherein each of the N LVDS receivers also receives a parity check word for a block of payload data received by the LVDS receiver and uses the parity check word to perform a parity check on the received block of payload data.

4. The method of claim 1, wherein when the parity check fails for an LVDS receiver, an indication is made that the LVDS receiver is defective.

5. The method of claim 4, further comprising storing an indication of the defective LVDS receiver in an LVDS Receiver Status Register.

6. The method of claim 1, further comprising: determining when one of the LVDS receivers is defective; deactivating the defective LVDS receiver; activating an (N+1)th LVDS receiver; and transmitting the payload data and synchronization information of the LVDS channel associated with the defective receiver, over an (N+1)th LVDS channel corresponding to the (N+1)th LVDS receiver.

7. The method of claim 1, further comprising: determining when one of the LVDS receivers is defective; deactivating the defective LVDS receiver; and transmitting the payload data and synchronization information of the LVDS channel associated with the defective LVDS receiver, over one of more of the (N−1) LVDS channels corresponding to the remaining (N−1) LVDS receivers that are not defective.

8. The method of claim 7, further comprising increasing the frequency of the M LVDS receive clocks.

9. The method of claim 8, further comprising increasing the frequency of the word clock.

10. The method of claim 1, wherein the second device is a display device, and wherein transmitting payload data and synchronization information from the first device to the second device over N LVDS channels, includes transmitting over each of the N LVDS channels a synchronization word, a column block number for the display device, a starting address for the payload data, a stop address for the payload data, a parity check word, and a number, X, of payload data words.

11. A device for receiving payload data from over a plurality of low voltage differential signaling (LVDS) channels, the device comprising: a word clock receiver adapted to receive a word clock and to generate therefrom M LVDS receive clocks from the word clock, each of the M LVDS receive clocks having a same frequency that is P times a frequency of the word clock, wherein P an integer, and each of the M LVDS receive clocks having a different phase with respect to each other; wherein M is an integer, and N LVDS receivers each adapted to receive data and synchronization information from a corresponding one of N LVDS channels, wherein N is an integer, wherein each of the N LVDS receivers includes, a differential line receiver adapted to receive the data and synchronization information; M sample shift registers each adapted to receive a corresponding one of the M LVDS receive clocks and in synchronization thereto, to store therein the synchronization information from the differential line receiver; M correlators each adapted to correlate a reference word with the synchronization information stored in a corresponding one of the M sample shift registers to produce a correlation value for each of the M LVDS receive clocks; a clock selector adapted to receive the correlation values from each of the M correlators and to select a one of the M LVDS receive clocks producing a greatest correlation value; and a data register adapted to receive the selected LVDS receive clock and in synchronization thereto, to store therein the payload data from the differential line receiver.

12. The device of claim 11, wherein the word clock receiver includes a phase lock loop.

13. The device of claim 11, further comprising an LVDS Receiver Status Register indicating whether each of the N LVDS receivers is operational or is defective.

14. The device of claim 11, wherein the phases of the M LVDS receive clocks are equidistant from each other.

15. The device of claim 11, wherein each of the N LVDS receivers further includes a parity check circuit adapted to use a parity check word for a block of payload data received by the LVDS receiver to perform a parity check on the received block of payload data.

16. The device of claim 11, further comprising a plurality of pixels for displaying the payload data.

17. The device of claim 11, wherein the clock selector comprises: a maximum detector adapted to receive the correlation values from each of the M correlators and to determine a one of the M LVDS receive clocks producing a greatest correlation value; and a phase selector adapted to receive each of the M LVDS receive clocks and a signal from the maximum detector, and in response to the signal from the maximum detector, to select the selected LVDS receive clock and output the selected LVDS receive clock to the data register.

18. The device of claim 11, wherein the word clock receiver comprises: a word clock differential line receiver adapted to receive the word clock; a voltage controlled oscillator adapted to generate the M LVDS receive clocks; a multiplexer adapted to select and output one of the M LVDS receive clocks as a feedback clock; a frequency divider adapted to divide a frequency of the feedback clock by P and to output a divided-down feedback clock; a phase detector adapted to receive the word clock from the word clock differential line receiver, to receive the divided-down feedback clock, to compare the word clock to the divided-down feedback clock and to output a control voltage that varies in accordance with a frequency difference between the word clock and the divided-down feedback clock; and a low pass filter adapted to low pass filter the control voltage and provide the low pass filtered control voltage to the voltage controlled oscillator.

19. A system for communicating payload data over a plurality of low voltage differential signaling (LVDS) channels, the system comprising: a data transmitting device, including, N LVDS transmitters adapted to transmit payload data and synchronization information over N LVDS channels; wherein N is an integer, a word clock transmitter adapted to transmit a word clock, where the word clock is synchronized to the payload data; and a data receiving device connected to the data transmitting device by N LVDS channels, the data receiving device including, a word clock receiver adapted to receive the word clock and to generate therefrom M LVDS receive clocks from the word clock, each of the M LVDS receive clocks having a same frequency that is P times a frequency of the word clock, wherein P an integer, and each of the M LVDS receive clocks having a different phase with respect to each other; wherein M is an integer, and N LVDS receivers each adapted to receive data and synchronization information from a corresponding one of the N LVDS channels, wherein each of the N LVDS receivers includes, a differential line receiver adapted to receive the data and synchronization information; M sample shift registers each adapted to receive a corresponding one of the M LVDS receive clocks and in synchronization thereto, to store therein the synchronization information from the differential line receiver (210); M correlators each adapted to correlate a reference word with the synchronization information stored in a corresponding one of the M sample shift registers to produce a correlation value for each of the M LVDS receive clocks; a clock selector adapted to receive the correlation values from each of the M correlators and to select a one of the M LVDS receive clocks producing a greatest correlation value; and a data register adapted to receive the selected LVDS clock and in synchronization thereto, to store therein the payload data from the differential line receiver.

20. The system of claim 19, wherein the word clock is transmitted over a separate LVDS channel.

* * * * *